Patented June 21, 1938

2,121,294

UNITED STATES PATENT OFFICE 2,121,294

SYNTHETIC RESINOUS MATERIAL AND METHOD OF PRODUCING IT

Irvin W. Humphrey, Wilmington, Del., assignor to Hercules Powder Company, Wilmington, Del., a corporation of Delaware No Drawing. Application May 14, 1935, Serial No. 21,381

19 Claims. (Cl. 260—99.40)

This invention relates to a new resinous material and method of producing.

In accordance with the method embodying this invention maleic anhydride is reacted with a reactive rosin compound containing unsaturated bonds typical of rosin acids and the reaction product hydrogenated.

The resinous material in accordance with this invention will comprise a maleic anhydride-rosin compound reaction product, the unsaturation of which is reduced by hydrogen and which contains a rosin acid radical and a reactive anhydride group derived from the maleic anhydride.

In carrying out the method in accordance with this invention for the production of products in accordance therewith, maleic acid may be used in place of maleic anhydride, since it will be converted into maleic anhydride at the reaction temperature. The reactive rosin compound will comprise rosin, refined or unrefined, rosin esters, rosin oil, abietyl alcohol, and the like compounds containing unsaturated bonds typical of rosin acids, such as abietic acid, pimaric acid, and the like.

By virtue of possessing a reactive anhydride group, the various resinous products in accordance with this invention may be reacted with an alkali, as sodium hydroxide, calcium hydroxide, potassium carbonate, etc., or with a reactive oxide as calcium oxide, ethylene oxide, etc., or with a suitable alcohol such as methanol, ethyl, butyl, amyl, propyl, hydroabietyl, cyclohexanol, benzyl, oleyl, tetrahydrofurfuryl, stearol, laurol, a glycol, as ethylene, butylene, propylene, or diethylene, glycol, gycerol, borneol, fenchyl, pentaerythrite, ethylene glycol monoethyl ether, sorbital, or mixtures thereof, etc.

The products in accordance with this invention will be adaptable for use in protective coatings such as lacquers, varnishes, etc., but for such use are preferably first converted into one of their more complex esters, by treatment with a polyhydric alcohol, such as ethylene glycol or glycerol. An excess of the polyhydric alcohol may be used over that required to combine with the anhydride group and any free hydroxyl groups thus introduced may be esterified by treatment with an organic acid such as acetic, citric, succinic, phthalic, abietic, dihydro or tetrohydro abietic, oleic, linoleic, butyric, propionic, linolenic, stearic, sebacic pimaric adipic, furoic, terpinene-maleic anhydride, pinene-maleic anhydride, butadiene-maleic anhydride, etc. or mixtures of suitable organic acids, yielding a product which is also adapted for use in protective coatings and in plastics. Drying or semi-drying oils may be used to modify the product, if desired.

The method in accordance with this invention for production of the new resinous materials embodying this invention and the character of the material will appear in greater detail from the following description and examples.

For the production of the composition embodying this invention, maleic anhydride may be reacted with rosin or a rosin acid, as, for example, abietic acid, primaric acid, or the like, with a rosin or rosin acid ester, as an ester of a monohydric or polyhydric alcohol, as, for example, ethyl abietate, methyl abietate, propyl abietate, bornyl abietate, tetrahydrofurfuryl abietate, lauryl abietate, stearyl abietate, hydroabietyl abietate, butyl abietate, amyl abietate, a glycol abietate, glycerol abietate, benzyl abietate, cyclohexanol abietate, ethylene glycol monobutyl abietate, phenyl abietate, etc., with an inorganic abietate as, for example, sodium, calcium, aluminum abietates, etc. with rosin oil, abietyl alcohol, or other reactive rosin compound containing unsaturated bonds typical of rosin acids.

The time required for effecting the reaction between maleic anhydride and a rosin compound of the type indicated will vary with the temperature used and the reactivity of the particular rosin compound involved. Generally speaking, with a temperature of about 125° C. to about 250° C., or higher, the reaction will require from about one to about fifteen hours. Where the rosin compound comprises abietic acid or one of its derivatives, the reaction will be effected at a temperature of about 125° C. to about 190° C. in a period of about two to about ten hours.

If desired, a catalyst may be used to facilitate the reaction. By way of example, paratoluene sulphonic acid, benzene sulphonic acid, or other suitable catalyst may be used.

For effecting the hydrogenation of the reaction product the reaction product will be subjected to treatment by contacting, in a molten state, or in solution in a suitable solvent, as, for example, ethyl acetate, butyl acetate, toluene, etc., with hydrogen in the presence of a hydrogenation catalyst under various conditions of pressure and temperature, depending upon the particular reaction product treated, the solvent used and the type and activity of the hydrogenation catalyst used. Generally speaking, where a base metal catalyst, as nickel, nickel-copper, cobalt, or mixtures thereof, is used the treatment will be at a temperature of about 125° C. to about 225° C., under a hydrogen pressure of about 200 lbs. to about 15,000 lbs., or within the narrower range about 1500 lbs. to about 5,000 lbs., and for a period of about ½ to about 2 hours. When a noble metal catalyst, as platinum, palladium, or the like, is used, a temperature of about 15° C. to about 50° C. and a hydrogen pressure down to atmospheric will be found effective.

Thus, broadly speaking, procedure in accordance with this invention will comprise the formation of a product of the reaction of maleic anhydride and a reactive rosin compound having unsaturated bonds typical of rosin acids, as abietic, pimaric and the like, and hydrogenating the product by treatment thereof with hydrogen under suitable conditions as indicated.

As illustrative of the preparation of a resinous material embodying this invention in accordance with the method embodying this invention, for example, 82 grams of technical ethyl abietate are heated with 20 grams of maleic anhydride at a temperature of 170° C. for eight hours. The reaction product may then be partially distilled at a temperature of about 225° C.–250° C. under about 5–10 Hg. mm. pressure to remove any unreacted ethyl abietate and maleic anhydride. The product will amount to about 85 grams of resinous material slightly softer than rosin, having an acid number of about 130 and a saponification number of about 250. The resinous product will be fairly pale in color and can be partly distilled under about 5 mm. pressure using a bath temperature of about 250° C. to 300° C.

The product is then melted by heat, or dissolved in a suitable solvent such as, for example, butyl acetate, to a concentration of 20%, and a powdered nickel catalyst added to the solution in the amount of 2%. Hydrogen is then agitated with the solution at a temperature of about 160° C. to about 190° C. and under a hydrogen pressure of about 2500 lbs. to about 2800 lbs. until the absorption of hydrogen practically ceases. The product will then be separated from the catalyst, by filtration, and recovered from solution, if treated in solution, by evaporation off of the solvent.

As a further illustration, for example, 80 parts of glycerol abietate, A. N. 5.8, thiocyanate value 72.8, are heated with 25 parts of maleic anhydride at 170° C. for 6 hours. Distilling off the non-reacted maleic anhydride will leave a hard resinous product, A. N. 134, S. N. about 220, thiocyanate value 1.6.

The product is then dissolved in, for example, ethyl acetate to a concentration of about 15%, and, in admixture with a powdered nickel catalyst, agitated with hydrogen at a temperature of about 210° C.–220° C. and under a hydrogen pressure of about 4,000–4,500 lbs.

As further illustrative, 224 parts of rosin oil are reacted with 56 parts of maleic anhydride by heating at about 170° C. for six hours. The reaction product is then treated at a temperature of about 225° C. and under a pressure of about 5 mm. mercury to distil off unreacted rosin oil. The distillate may amount to as much as one-half of the original rosin oil, depending upon the acidity, method of production, etc., of the rosin oil. The product in solution is then hydrogenated by treatment with hydrogen in the presence of, for example, a platinum catalyst, at a temperature of about 30° C. and under 15 lbs. hydrogen pressure, and finally separated from the catalyst and solvent if in solution.

As a further illustration, for example, 160 parts of abietic acid or rosin and 54 parts of maleic anhydride are admixed and heated at a temperature of say 170° C. for say about three hours. The heating is desirably carried out in a bath. On completion of the heating for about three hours, the temperature of the bath may be desirably raised to about 250° C. and the pressure on the reaction mass reduced say to a pressure of about 5 mm. mercury in order to remove small amounts of free maleic anhydride.

The reaction product will be hydrogenated, for example, by contacting hydrogen with a solution thereof in toluene, at a temperature of about 180–200° C. and under a hydrogen pressure of about 2000–2200 lbs., in the presence of a powdered nickel catalyst which should be mixed with the solution. On completion of the hydrogenation the catalyst will be filtered out and the hydrogenated product recovered by distilling off the solvent.

Various other rosin compounds, as abietyl alcohol, abietic anhydride, etc. may be reacted with maleic anhydride and the hydrogenation thereof will be effected as described above with the use of rosin oil, rosin esters and rosin.

Generally about one mol. of maleic anhydride will be used per mol. of an abietic acid ester, if the latter is derived from a monohydric alcohol, but the molar proportion of the anhydride may range about 0.8 to 1.2, depending chiefly upon the reactivity of the isomers present in the abietic acid ester. In event the ester is a diabietate it will normally require twice as much maleic anhydride, while a triabietate will usually take three times as much anhydride per mol. as a monoabietate.

In proceeding for the preparation of the product, the maleic anhydride and the rosin compound may be reacted in solution in a suitable solvent, as, for example, xylene, tetralin, chlorbenzene, etc. Where the reaction is effected in the presence of a solvent the above procedure may be followed and the product, after the reaction has been effected, separated from the solvent by distillation.

Compositions in accordance with this invention, as has been indicated, may be formed by reacting various reactive rosin compounds having unsaturated reactive bonds typical of rosin acids with maleic anhydride following the procedure exemplified.

The hydrogenated product may, if desired, be neutralized with an alcohol, as for example, a monohydric alcohol or a polyhydric alcohol and, if desired, though not necessarily, the alcohol treated product may be subjected to treatment with, for example, an organic acid to effect esterification of any free hydroxyl groups introduced as a result of treatment with an excess of alcohol. In connection with treatment of the hydrogenated reaction product with an alcohol, an esterification catalyst, as for example, toluene sulphonic acid, sulphuric acid, etc. may be used.

Some decolorizing usually occurs during the hydrogenation process.

Where the treatment is with certain monohydric alcohols, such as butyl, benzyl, amyl alcohol, the treatment will involve heating the alcohol together with the reaction product under atmospheric pressure at a suitable temperature, say within the range 120° C. to 225° C. On the other hand, where the treatment is with a lower aliphatic alcohol, such as methyl, ethyl alcohol, or the like, the treatment generally will involve heating at a suitable temperature, say within the range about 150° C.–250° C. under suitable pressure, for example, 200–1000 pounds, and where the treatment is with a polyhydric alcohol, as ethylene glycol, glycerol, sorbitol, pentaerythrite, etc., the treating will be at a temperature of about 200° C.–275° C.

Many of the hydrogenated rosin compound-maleic anhydride reaction products may be partially distilled under vacuum, say about 5 mm. pressure, making a preliminary cut to separate any unreacted reagents and then distilled up to a bath temperature of about 300° C. making cuts if desired at about 260° C. and 300° C. and leaving a residue. Either the distillates or the residue may be hydrogenated and then, if desired, treated with alcohols.

In carrying out the method embodying this invention for the production of the new resinous composition, it will be understood that the details of procedure given above are for purposes of illustration only and that I do not contemplate limitation of my invention thereto, since various modifications in details of procedure may be made without departing from my invention. It will also be understood that maleic acid may be reacted with a reactive rosin compound instead of maleic anhydride.

This application is a continuation in part of application for U. S. patent of Irvin W. Humphrey, Serial No. 561,003, filed September 3, 1931 (now United States Patent No. 2,025,947).

What I claim and desire to protect by Letters Patent is:

1. A reaction product of maleic anhydride with a reactive rosin compound having an arrangement of unsaturated chemical positions characteristic of rosin acids, the unsaturation of the product being reduced by hydrogen.

2. A reaction product of rosin and maleic anhydride, the unsaturation of the product being reduced by hydrogen.

3. A reaction product of abietic acid and maleic anhydride, the unsaturation of the product being reduced by hydrogen.

4. A reaction product of an ester of abietic acid and maleic anhydride, the unsaturation of the product being reduced by hydrogen.

5. A reaction product of a rosin acid ester and maleic anhydride, the unsaturation of the product being reduced by hydrogen.

6. A reaction product of a dihydric alcohol ester of abietic acid and maleic anhydride, the unsaturation of the product being reduced by hydrogen.

7. A reaction product of a polyhydric alcohol ester of abietic acid and maleic anhydride, the unsaturation of the product being reduced by hydrogen.

8. A reaction product of a glycerol ester of abietic acid and maleic anhydride, the unsaturation of the product being reduced by hydrogen.

9. The method of producing a synthetic resin, which includes reacting maleic anhydride with a reactive rosin compound having an arrangement of unsaturated positions characteristic of rosin acids and hydrogenating the product.

10. The method of producing a synthetic resin, which includes reacting maleic anhydride with a reactive rosin compound having an arrangement of unsaturated positions characteristic of rosin acids, and hydrogenating the product under a pressure of about 200 to about 15,000 lbs. per square inch in the presence of a base metal catalyst.

11. The method of producing a synthetic resin, which includes reacting a rosin acid with maleic anhydride and hydrogenating the product.

12. The method of producing a synthetic resin, which includes reacting abietic acid with maleic anhydride and hydrogenating the product.

13. The method of producing a synthetic resin, which includes reacting an abietic acid ester with maleic anhydride and hydrogenating the product.

14. The method of producing a synthetic resin, which includes reacting a dihydric alcohol ester of abietic acid with maleic anhydride and hydrogenating the product.

15. The method of producing a synthetic resin, which includes reacting a polyhydric alcohol ester of abietic acid with maleic anhydride and hydrogenating the product.

16. A reaction product of a polyhydric alcohol ester of a rosin acid and maleic anhydride, the unsaturation of the product being reduced by hydrogen.

17. The method of producing a synthetic resin which includes reacting glycerol abietate with maleic anhydride and hydrogenating the product.

18. The method of producing a synthetic resin which includes reacting glycol abietate with maleic anhydride and hydrogenating the product.

19. A reaction product of glycol abietate and maleic anhydride, the unsaturation of the product being reduced by hydrogen.

IRVIN W. HUMPHREY.